United States Patent [19]
Radia et al.

[11] Patent Number: 5,581,761
[45] Date of Patent: Dec. 3, 1996

[54] METHODS AND APPARATUS FOR PROVIDING AN EXTENSIBLE SET OF AUXILIARY SERVICES FOR OBJECTS IN AN OBJECT-ORIENTED SYSTEM

[75] Inventors: Sanjay R. Radia, Fremont; Michael L. Powell, Palo Alto; Michael N. Nelson, San Carlos, all of Calif.

[73] Assignee: Sun Microsystems, Inc., Mountain View, Calif.

[21] Appl. No.: 94,455

[22] Filed: Jul. 20, 1993

[51] Int. Cl.$^6$ ................................. G06F 9/44; G06F 7/00
[52] U.S. Cl. ................... 395/702; 395/601; 364/DIG. 1; 364/DIG. 2; 364/281.3; 364/282.1; 364/284.4; 364/962
[58] Field of Search ................................. 395/700, 600, 395/200; 364/DIG. 1, DIG. 2

[56] References Cited

U.S. PATENT DOCUMENTS

| | | | |
|---|---|---|---|
| 5,247,669 | 9/1993 | Abraham et al. | 395/600 |
| 5,265,206 | 11/1993 | Schackelford et al. | 395/200 |
| 5,280,610 | 1/1994 | Travis, Jr. et al. | 395/600 |
| 5,327,559 | 7/1994 | Prieven et al. | 395/700 |
| 5,341,478 | 8/1994 | Travis, Jr. et al. | 395/200 |
| 5,377,350 | 12/1994 | Skinner | 395/600 |

FOREIGN PATENT DOCUMENTS

0501610A3  9/1992  European Pat. Off.

OTHER PUBLICATIONS

IBM Technical Disclosure Bulletin, vol. 32, No. 10A, Mar. 1990, New York, Entitled: Object Data Manager.

*Primary Examiner*—Kevin A. Kriess
*Assistant Examiner*—Majid A. Banankhah
*Attorney, Agent, or Firm*—Blakely Sokoloff Taylor & Zafman

[57] ABSTRACT

An extensible set of auxiliary services for objects in an object-oriented system. Every object in an object-oriented system is implemented by an associated object manager. Each object manager in the present invention has an associated object manager identifier that identifies the object manager. Each object manager in the system can optionally provide various auxiliary services for objects that the object manager implements. These auxiliary services are objects implemented by the object manager itself, or by another object manager. For a particular type of auxiliary service, different object managers may provide different auxiliary services. For example, two object managers may provide two different freeze-melt services. For each type of auxiliary service type, there is a well-known context in which auxiliary services of that type are associated with names. For each type of auxiliary service, there is also a well-known function that transforms an object manager identifier into a name. When a client of an object needs to access an auxiliary service for an object, the client first invokes an operation within the object that provides the object manager identifier for the object manager that manages the object. The client then passes the object manager identifier to the well-known function for the desired type of auxiliary service that transforms the object manager identifier into a name. The client resolves the transformed name within a well-known context for the type of auxiliary service desired to obtain a representation of the desired auxiliary service.

10 Claims, 7 Drawing Sheets

METHODS AND APPARATUS FOR PROVIDING AN EXTENSIBLE SET OF AUXILIARY SERVICES FOR OBJECTS IN AN OBJECT-ORIENTED SYSTEM

BACKGROUND OF THE INVENTION

1. Field of the Invention

The present invention relates to the field of object-oriented programming. More particularly, the present invention relates to a method for providing an extensible set of auxiliary services for objects in an object-oriented system and a method for providing secure freeze services.

2. Art Background

In an object-oriented system, an object comprises a collection of data along with a set of functions for manipulating the collection of data. The collection of data is referred to as the object's state data. The functions for manipulating the state data are referred to as operations. Each object has an associated object manager which is the server that implements the operations of the object and maintains the collection of data in the object.

To perform an operation on an object, a client sends a message to the object to "invoke" one of the operations within the object. The message sent to an object comprises an operation selector and parameter data. The operation selector in the message selects the operation within the object that will be used to manipulate the object. The parameter data in the message provides external information that will be used by the invoked operation. After the operation has completed, the operation usually returns a return value to the client that provides the results of the operation invocation.

In addition to the unique operations within each object, it is convenient to have a set of "auxiliary services" that perform maintenance operations on the objects within the system. Examples of auxiliary services include a freeze-melt service for creating persistent objects and a duplication service for creating copies of objects with different access rights. The auxiliary services for an object may be implemented by the object's object manager or by another object manager. For a particular auxiliary service type, different object managers may provide different auxiliary services. For example, two different object managers may provide two different freeze-melt services. Since the auxiliary services may perform sensitive operations, access to auxiliary services must be made secure.

SUMMARY OF THE INVENTION

It is therefore an objective of the present invention to provide a set of auxiliary services for the objects in the object-oriented system.

It is a further objective of the present invention to provide said set of auxiliary services in a manner such that the set of auxiliary services is extensible.

It is a further objective of the present invention to provide a secure freeze-melt service in said set of auxiliary services.

It is a further objective of the present invention to provide a duplication service that creates copies of objects with different access rights in said set of auxiliary services.

The above and other objectives are accomplished by the present invention which provides an extensible set of auxiliary services for objects in an object-oriented system. Every object in an object-oriented system is implemented by an associated object manager. Each object manager in the present invention has an associated object manager identifier (OMID) that identifies the object manager. Each object manager in the system can optionally provide various auxiliary services for the objects that the object manager implements. These auxiliary services are objects implemented by the object manager itself, or by another object manager. For each type of auxiliary service, there is a well-known context in which auxiliary services of that type are associated with names. For each type of auxiliary service, there is also a well-known transformation function that transforms the object manager identifier into a name; this is the name with which the auxiliary service of that type is associated with in the well-known context. When a client of an object needs to access an auxiliary service, the client first invokes an operation within the object that provides the object manager identifier (OMID) for the object manager that manages the object. The client then passes the object manager identifier to the well-known transformation function for the desired type of auxiliary service. The well-known function for the desired type of auxiliary service returns a name generated from the OMID. The client resolves the transformed name within the well-known context for the type of auxiliary service desired. The resolve operation returns the auxiliary object such that the client can now access the auxiliary service.

BRIEF DESCRIPTION OF THE DRAWINGS

The objects, features, and advantages of the present invention will be apparent to one skilled in the art in view of the following detailed description in which.

DETAILED DESCRIPTION OF THE INVENTION

A method for providing an extensible set of auxiliary services for objects in an object-oriented system is disclosed. In the following description, for purposes of explanation, specific configurations of the system are set forth in a preferred embodiment in order to provide a thorough understanding of the present invention. However, it will be apparent to one skilled in the art that the present invention may be practiced without the specific details of the preferred embodiment. In other instances, well known circuits and devices are shown in block diagram form in order not to obscure the present invention unnecessarily.

An object-oriented computer system consists of a number of individual software "objects". Each object in the system comprises a collection of data along with a set of functions that manipulate the collection of data in the object. The collection of data is referred to as the object's state data. The functions that manipulate the state data in the object are referred to as operations. Each object in the system has an object manager which is the server that implements the operations of the object and maintains the collection of data within the object.

Figure 1:
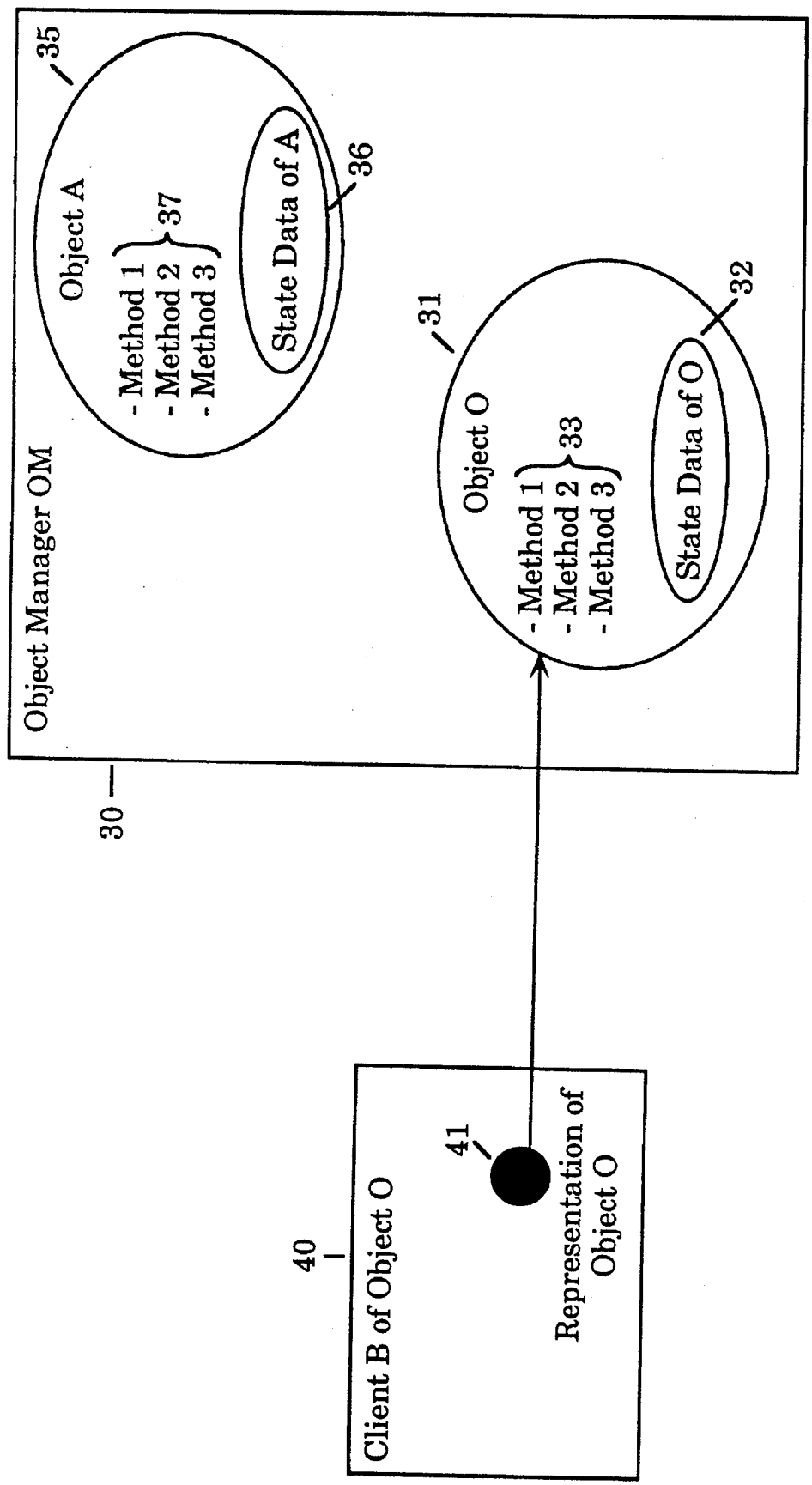
FIG. 1 is a block diagram illustration of objects O and A managed by an object manager OM and a client of object O that has a representation of object O.

For example, referring to FIG. 1, an object manager OM 30 is illustrated. Object manager OM 30 implements two objects: object O 31 and object A 35. Object O 31 and object A 35 each contain state data (32 and 36 respectively) and a set of operations used to manipulate the state data (33 and 37 respectively).

An object in an object-oriented system is used by "clients" of the object. The clients of an object manipulate the object by invoking the operations within the object or passing the object as a parameter in an operation on another object. Generally, the client of an object is unaware of the location or implementation of the object. To invoke an operation within an object or pass an object as a parameter, the client must have some representation of the object. The representation of the object provides all the necessary information to direct operations to the object. Ordinarily, the client of an object is unaware of the details of the representation of the object.

Referring back to FIG. 1, Client B 40 is a client of object O 31. To access object O 31, Client B 40 has a representation 41 of object O. To invoke an operation within object O 31 or pass object O 31 as a parameter, Client B 40 uses the representation 41 of object O.

Each object in an object-oriented system can be given one or more names. An object name usually consists of a string of printable characters. In the present invention, an object name is associated with an object within a "context" such that the object name is unique within the context. A context is an object that contains a list of name-to-object associations. The process of assigning a name to an object within a "context" is referred to as "binding" the name to the object. Context objects are implemented in a special type of object manager referred to as a "name server".

Figure 2A:
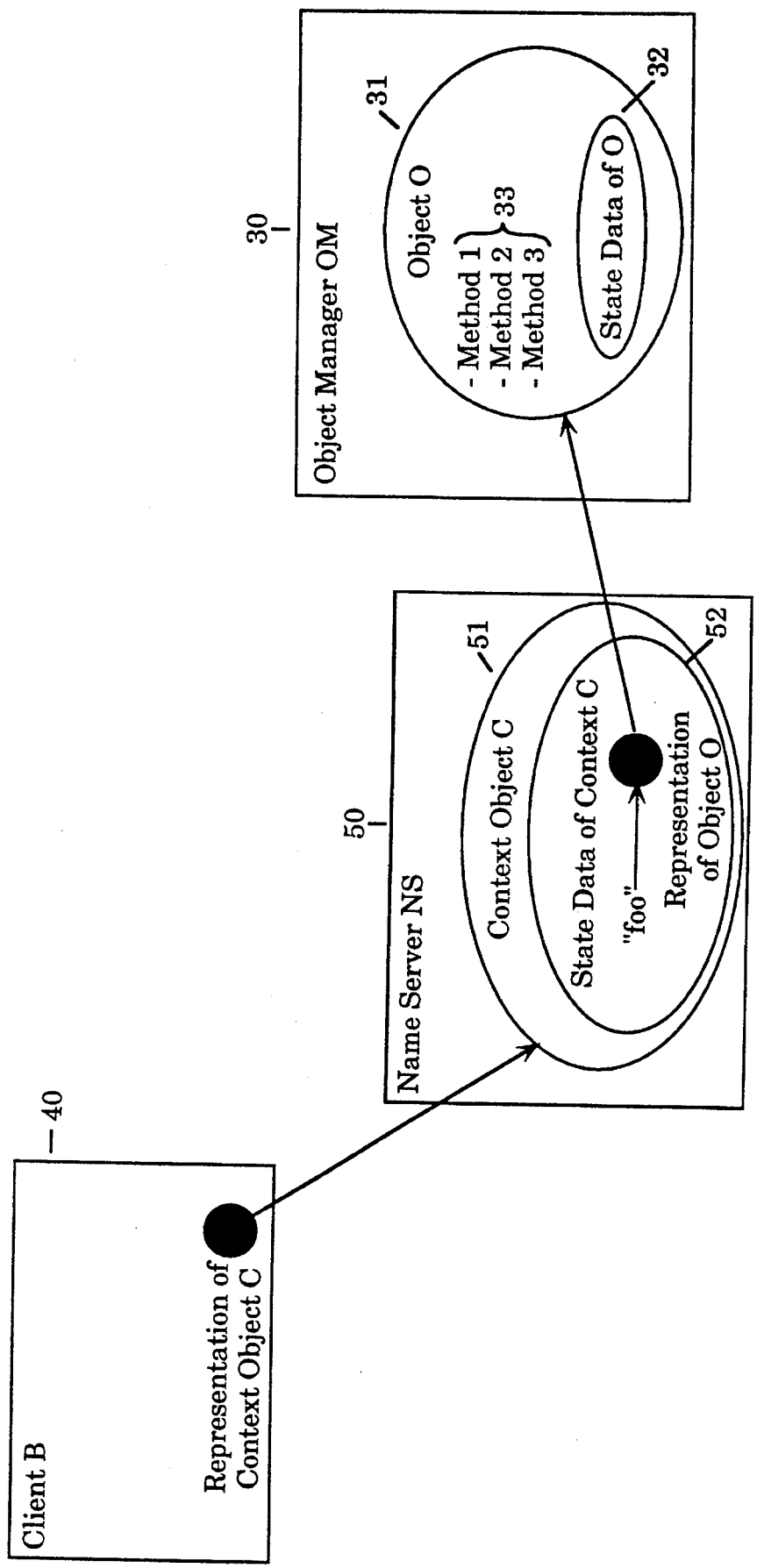
FIG. 2a is a block diagram illustration of an object O managed by an object manager OM, a context object C that contains a binding of the name "foo" to object O, and a client B that has a representation of context object C.

For example, referring to FIG. 2a, Object O 31 is an object implemented in Object Manager OM 30. Context C 51 is a context object implemented within Name Server NS 30. Context C 51 contains state data 52 and a set of operations 53 for manipulating the state data 52 within context object C 51. In FIG. 2a, Context C's state data 52 contains an association between the name "foo" and object O 31. Thus, within Context C, object O 31 is bound to the name "foo".

A client that knows the name of a particular object can access the object by first "resolving" the name of the object within a context to obtain a representation of the object. The client can then access the object using the representation of the object received from the context object.

Figure 2B:
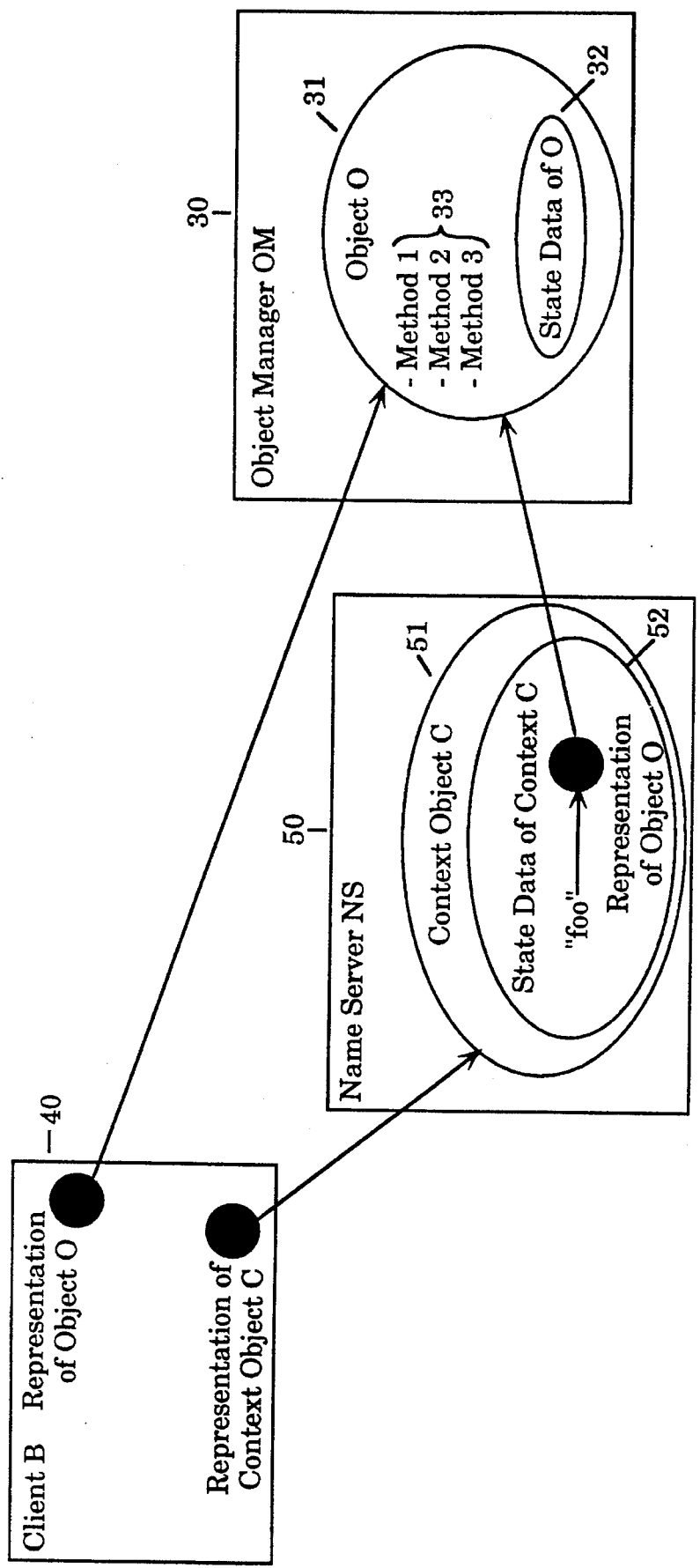
FIG. 2b is the block diagram illustration of FIG. 2a after client B has resolved the name "foo" within context object C to receive a representation of object O.

Referring again to FIG. 2a, client B 40 desires to access an object named "foo" within Context C 51. To obtain a representation of the object, the client requests Context C 51 to resolve the object name "foo" by invoking the resolve operation in Context C 51. The resolve operation examines the state data 52 in Context C 51 returns the representation of object O 31 to client B 40 as illustrated in FIG. 2b such that client B 40 now has a direct representation of object O 31.

An Extensible Set of Auxiliary Services

The operations that an object can perform are defined by the set of operations implemented within the object. In addition to the unique operations implemented within each object, it is convenient to have a set of auxiliary services that can perform maintenance operations on objects within a system. For example, an auxiliary service for duplicating objects and an auxiliary service for freezing and melting objects should be available. In general, different objects may have different types of auxiliary services available. Furthermore, for a particular auxiliary service type, different object managers may provide different auxiliary services. For example, two different object managers may provide two different freeze-melt services.

One way to implement a set of auxiliary services would be to implement each auxiliary service as an operation within each object in the system. However, this technique has several drawbacks. One problem with that technique is that it would be very difficult to add a new auxiliary service to an installed system. To add a new operation to an object requires changing the object's interface, writing new code to perform the new operation, and recompiling the object with the new code. Every object would have to be modified, even objects that do not provide the new auxiliary service. In a large installed object-oriented system, it would be difficult to recompile every object in the system every time a new auxiliary service is added. Furthermore, every client that uses a modified object may need to be recompiled to use the new interface. Since every object was recompiled, every client will also have to be recompiled. It is therefore desirable to be able to add auxiliary services to an object-oriented system without recompiling every object in the system.

The present invention comprises a mechanism providing an extensible set of auxiliary services for the objects in an object-oriented system. To provide an extensible set of auxiliary services in the present invention, every object in the system implements an operation entitled "get_OMID()" (get object manager identifier). When a client invokes the get_OMID() operation within an object, the get_OMID() operation returns the object manager identifier (OMID) associated with the object manager that implements the object. The client of the object then passes the object manager identifier (OMID) received to a well-known function for the desired type of auxiliary service that transforms the OMID into a name. The client of the object then resolves the transformed name in a well-known context for the desired type of auxiliary service to obtain a representation of the desired auxiliary service.

Thus, to add a new auxiliary service to a system that uses the mechanism of the present invention, an administrator has to establish a well-known context for the new auxiliary service type and a well-known function for the new auxiliary service type that transforms an object manager identifier into a name. For an object that wishes to provide the new auxiliary service, the object's object manager creates the new auxiliary service and binds the new auxiliary service to the name returned by the well-known function within the well-known context. Only the object managers of the object that provide the new auxiliary service and the clients that use the new auxiliary service need to be recompiled. Other object managers whose objects do not provide the new auxiliary service and other clients who do not use the new auxiliary service need not be recompiled.

Figure 3A:
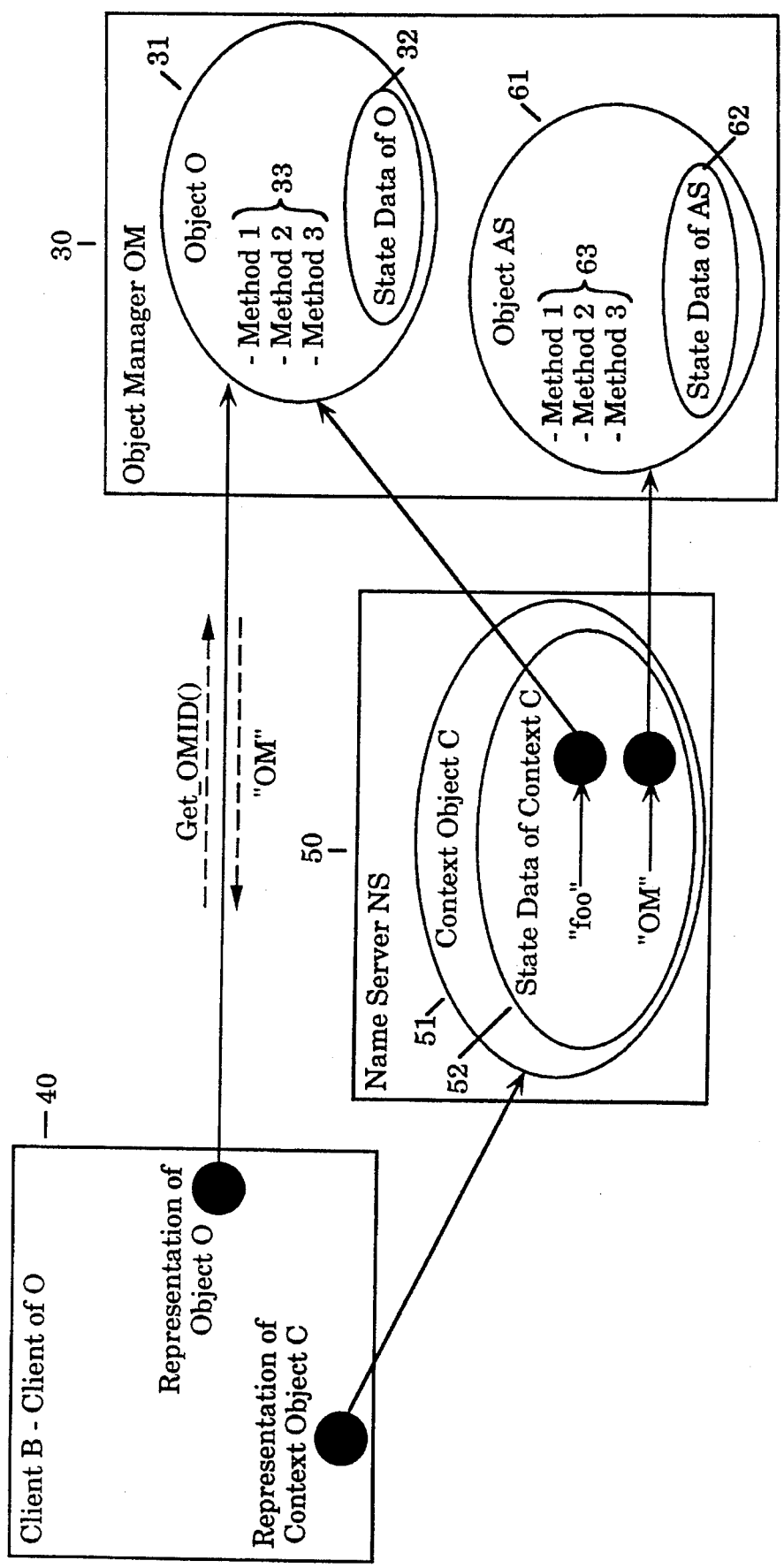
FIG. 3a is a block diagram illustration of an object O managed by an object manager OM, a context object C that contains a binding of the name "foo" to object O and a binding of the name "OM" to object AS, and a client B that has a representation of context object C and a representation of object O.

The mechanism of providing an extensible set of auxiliary services disclosed by the present invention is best described with reference to the block diagrams in FIGS. 3a to 3c and the flow diagram illustrated in FIG. 4. Referring to FIG. 3a, an object manager OM 30 implements two objects: object O 31 and object AS 61. Client B 40 in FIG. 3a is a client of object O and therefore has a representation of object O. If Client B 40 in FIG. 3a needs to use an auxiliary service to perform an operation on object O 31, Client B 40 must follow the series of steps disclosed in FIG. 4 to obtain the auxiliary service.

Figure 4:
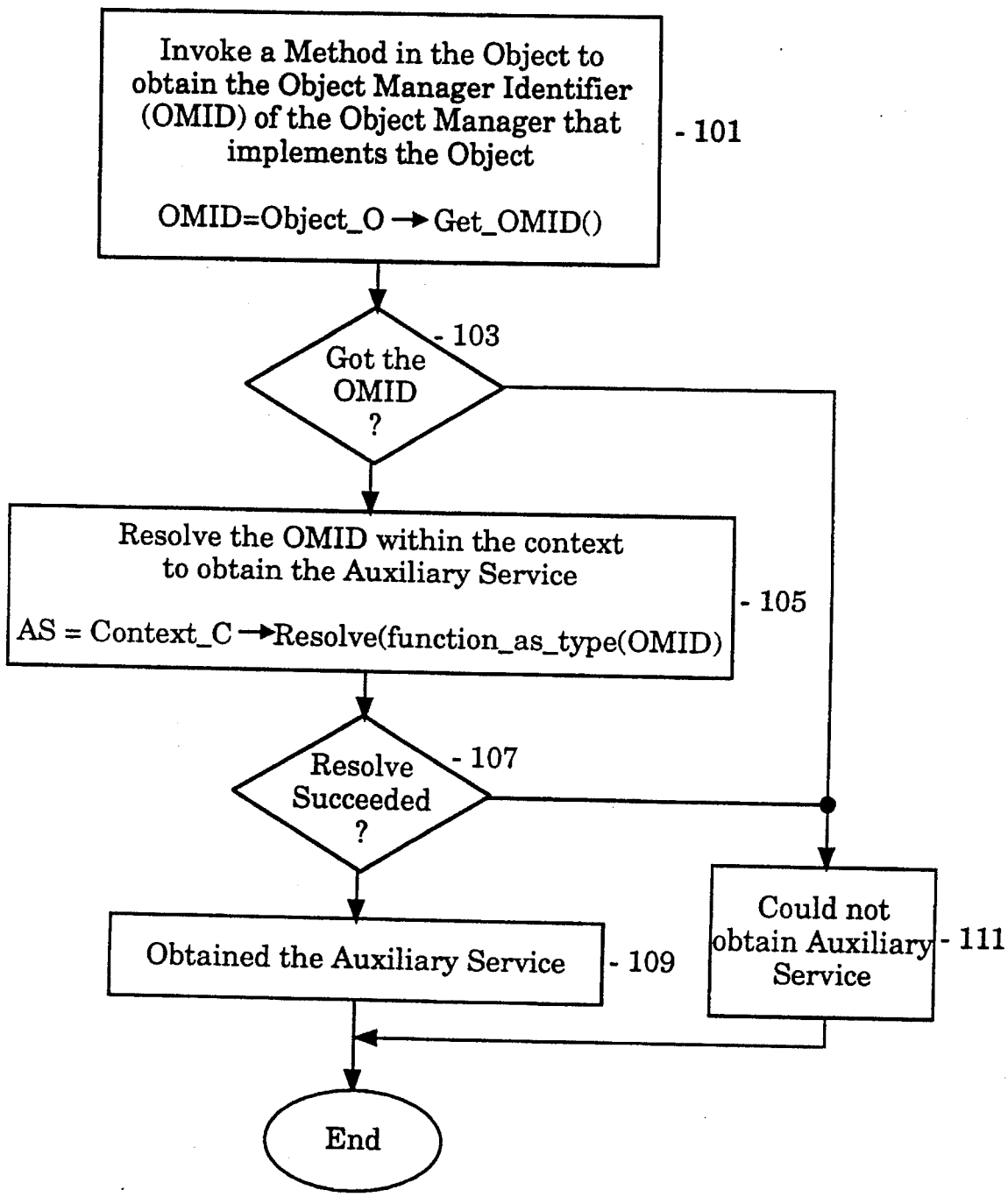
FIG. 4 is a flow diagram containing the steps required to obtain access to the auxiliary services for an object.

Referring to FIG. 3a and step 101 in FIG. 4, Client B 40 first invokes the "Get_OMID()" operation within object O 31 to get the object manager identifier for the object manager that implements the object. At step 102, the return value of the Get_OMID() operation is tested. If the Get_OMID() operation completes successfully, an object manager identifier name will be returned to the client and the client proceeds to step 105. For example, as illustrated in FIG. 3a, the name "OM" is returned to the client. However, if the Get_OMID() operation within object O 31 fails and does not return a proper object manager identifier name, the attempt to obtain auxiliary services is abandoned at step 111 of FIG. 4.

After receiving a proper object manager identifier name, the client calls a well known function for the desired auxiliary service type that transforms the OMID into a name associated with desired auxiliary service. (The transformation function may be simply an identity function that returns the object manager identifier unaltered.) Referring to step 105 of FIG. 4, the client resolves the transformed name within a well known context where that type of auxiliary services are bound. For example, the client issue the resolve request "AS=Context_C→Resolve(function_as_type(OMID))" where function_as_type(OMID) transforms the OMID into a name for the desired type of auxiliary service.

Figure 3B:
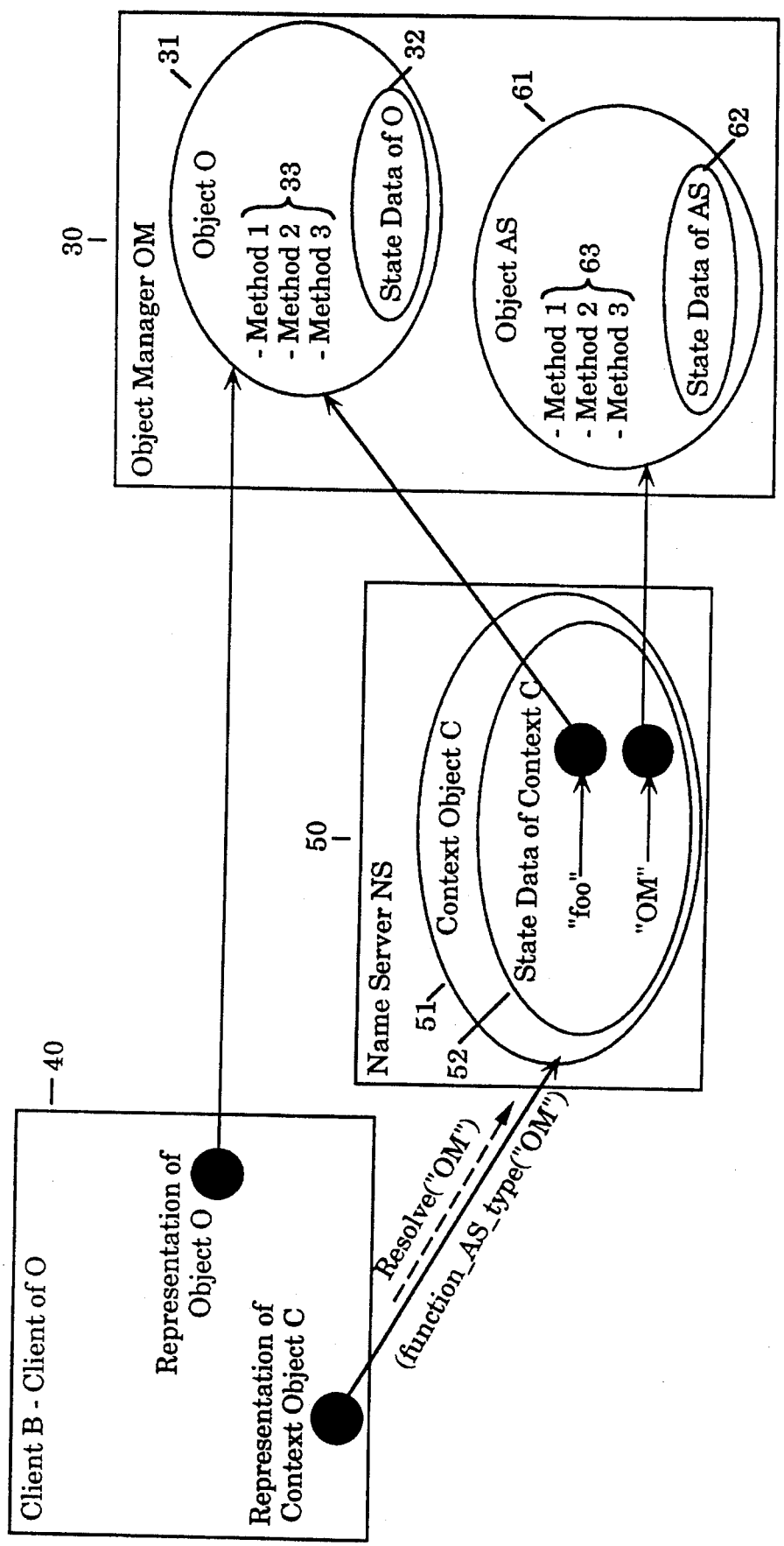
FIG. 3b is a block diagram illustration of FIG. 3a after client B has obtained an OMID from object O and has requested a resolve operation in context object C.
Figure 3C:
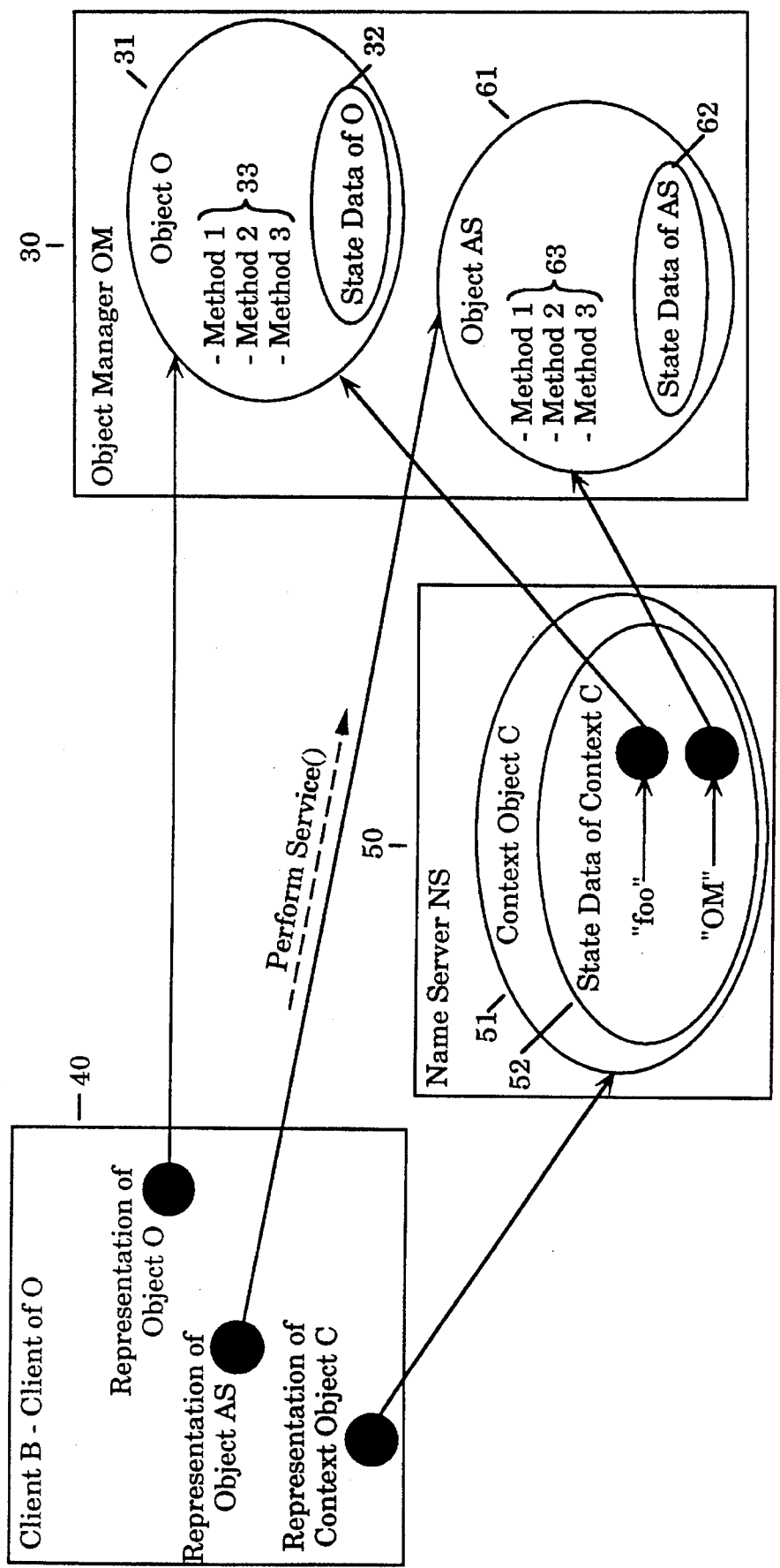
FIG. 3c is a block diagram illustration of FIG. 3b after context object C has resolved the OMID returning a representation of object AS that performs auxiliary services.

In FIG. 3b, Client B 40 requests the context object C to resolve the name returned from the transformation function "function_AS_type("OM"). At step 107 the return value of resolve operation is tested. If the resolve operation completes successfully, a representation of the auxiliary service will be returned to the client. FIG. 3c illustrates a successful resolve operation where a representation of an auxiliary service AS is returned to client B. However, if the resolve operation within Context C fails to find an object bound to that name, then the attempt to obtain the auxiliary service is abandoned at step 111 of FIG. 4.

After receiving the auxiliary service, client B can request the auxiliary service to perform any of its operations. For example, referring to FIG. 3c, to perform an auxiliary service on object O 31, client B invokes an operation within the auxiliary service object AS and specifies object O as a parameter.

It will be appreciated that the mechanism of the present invention must be implemented in a manner such that only the "real owner" of auxiliary service name can bind that auxiliary service name within a context. Otherwise it would be easy to break the security of the system.

The Freeze-Melt Auxiliary Service

An important type of auxiliary service is the freeze-melt service. The freeze-melt service enables a client to make an object persistent such that the client can later reaccess the object. A client makes an object persistent by first requesting the freeze-melt service to freeze an object. After freezing the object, the freeze-melt service returns a freeze token that identifies the frozen object. To retrieve an object that was previously frozen, the client the requests the freeze-melt service to melt the object and provides the freeze token as a parameter. The freeze-melt service then melts the object and returns a representation of the object to the requesting client.

A persistent name server uses the freeze-melt service when binding and resolving names such that the object is kept persistent. Since freeze tokens may be forged by a malicious client, the connection to a freeze service must be authenticated to ensure that the entity requesting a melt operation is trusted to melt the particular object. Therefore, it is important that a name server ensure that it freezes and melts objects using the same freeze-melt service. Otherwise it is quite easy to compromise security of the name service. For example, it would be natural to combine the steps of getting the name of the freeze-melt service using the object manager identifier (OMID) and performing the freeze operation into a single operation. Without using the extensible auxiliary services mechanism defined above, the most obvious method of implementing the freeze-melt services would be to implement a "freeze" operation within each object that freezes the object and returns the object manager identifier (OMID) and a freeze token in a single step. Then the bind and resolve operations in a persistent name server could be implemented as:

Bind(name, bind_type, object):
<omid, freeze_token>=Object_O→freeze();
store_binding(name, bind_type, omid, freeze_token);

To melt an object during a resolve operation, the persistent name server performs two steps. First, the persistent name server obtains the representation of a freeze-melt service object using the OMID. Then the persistent name server melts the object by invoking a melt operation within the freeze-melt service with the freeze token as a parameter:

Resolve(name, mode):
<omid, freeze_token>=get_binding_for_name(name);
freeze_melt_service=Context→resolve(function_freeze_melt(omid));
Object_O=freeze_service→melt(freeze_token, mode);

However, this straight-forward approach has a security problem. A malicious client acting in concert with a malicious object manager can compromise the security of the name server by performing the following steps:

1) Obtain the freeze token and object manager identifier of an object to be attacked. (For example, a password file object.)
2) Have the malicious client bind a name to an object implemented by the malicious object manager.
3) In response to the freeze operation, the malicious object manager returns the freeze token and the object manager identifier of the object being attacked.
4) The malicious client then requests the name-server to resolve the object for write-mode. (The malicious client has permission since the malicious client did the bind.)

Thus, the name server is tricked into performing the melt operation at the freeze-melt service of the password file object and returning the file in write-mode. To avoid this security problem, both the freeze and melt operations should be performed by the same freeze-melt service.

The present invention's mechanism of providing auxiliary services, as defined in the previous section, can be used to implement a secure freeze-melt service. For example, to implement a secure persistent name server using the PI, the bind and resolve operations in the persistent NS are implemented as follows:

Bind(name, bind_type, object):
    omid=Object_O→Get_OMID();
    freeze_melt_service=Context→resolve(function_freeze_melt(omid));
    freeze_token=freeze_melt_service→freeze(Object_O);
    store_binding(name, bind_type, omid, freeze_token);
Resolve(name, mode):
    <omid, freeze_token>=get_binding_for_name(name);
    freeze_melt_service=Context→resolve(function_freeze_melt(omid));
    Object_O=freeze_melt_service→melt(freeze_token, mode);

It is apparent that in the mechanism of the present invention, the same freeze-melt service is used to provide both the freeze operation and the melt operation since both the bind and the resolve operations obtain the freeze-melt service using the same step:

freeze_melt_service=Context→resolve(function_freeze_melt(omid));

Duplication Auxiliary Service

Another important auxiliary service is an duplication service. The duplication service is used by name servers to create copies of objects during resolve operations. The copies of objects created by the duplication service can be created with different "modes" or access privileges. For example, a client may request a name server to resolve the name of an object and return the object in a "read only" mode.

The extensible set of auxiliary services provided by the present invention can be used to implement a duplication service. To access the duplication service, a client follows the steps set forth in FIG. 4.

For example, the following listing implements a resolve operation in a name server that duplicates an object in a requested mode and then returns the duplicated object:

Resolve(name, mode):
    <omid, object>=get_binding_for_name(name);
    duplication_service=Context→resolve(function_duplication(omid));
    duplicate_object=duplication_service→duplicate(object, mode);
    return_to_client(duplicate_object);

Accordingly, apparatus and methods for providing an extensible set of auxiliary services for objects in an object-oriented system have been disclosed. Although the present invention has been described with reference to FIGS. 1–4, it will be apparent to one skilled in the art that the present invention has utility far exceeding that disclosed in the figures. It is contemplated that many changes and modifications may be made, by one of ordinary skill in the art, without departing from the spirit and scope of the invention as disclosed herein.

What is claimed is:

1. In an object-oriented system, said object-oriented system comprising first object manager, said first object manager managing a plurality of objects, a method providing an extensible set of auxiliary services for the objects in said object-oriented system, said method comprising the steps of:

creating a plurality of auxiliary service objects, each of said plurality of auxiliary service objects comprising at least one auxiliary service operation;

providing a name server, said name server comprising a plurality of context objects, each of said context objects comprising a plurality of name-to-object associations;

implementing a "get object manager identifier" operation in each of said plurality of objects, said "get object manager identifier" operation returning an object manager identifier associated with an object manager that manages said object;

transforming said object manager identifier into an auxiliary service object name having a desired auxiliary service;

resolving said auxiliary service object name associated with said desired auxiliary service in one of said plurality of context objects to receive a representation of said auxiliary service object; and invoking one of the auxiliary service operations within said auxiliary service object using said representation of said auxiliary service object.

2. The method providing an extensible set of auxiliary services as claimed in claim 1, wherein said auxiliary service object name associated with a desired auxiliary service comprises a name that identifies said desired auxiliary service with said object manager.

3. The method providing an extensible set of auxiliary services as claimed in claim 1, wherein one of said auxiliary services is a freeze-melt service, said freeze-melt service used to make objects persistent.

4. The method providing an extensible set of auxiliary services as claimed in claim 1, wherein one of said auxiliary services is an object duplication service, said object duplication service used to create copies of objects.

5. The method providing an extensible set of auxiliary services as claimed in claim 4, wherein said object duplication service creates copies of objects with different access rights.

6. The method providing an extensible set of auxiliary services as claimed in claim 1, wherein a new auxiliary service is added by implementing said new auxiliary service object and binding at least one auxiliary service object name to said new auxiliary service object in one of said plurality of contexts.

7. In an object-oriented system, said object-oriented system comprising an object manager, said object manager managing a plurality of objects, a method providing a secure freeze-melt service, said method comprising the steps of:

creating a freeze-melt service object, said freeze-melt service object comprising a freeze operation and a melt operation, said freeze-melt service object having at least one freeze-melt service object name;

providing a name server, said name server comprising a context object, said context object comprising a plurality of name-to-object associations, one of said plurality of name-to-object associations comprising an association of said freeze-melt service object name to a representation of said freeze-melt service object;

implementing a "get object manager identifier" operation in each of said plurality of objects, said "get object manager identifier" operation returning an object manager identifier associated with said an object manager that manages the object;

implementing a transformation function that transforms said object manager identifier into said freeze-melt service object name;

obtaining for an object access to both said freeze operation and said melt operation by
    invoking said "get object manager identifier" operation in said object to obtain said object manager identifier;

calling said transformation function to transform said object manager identifier into said freeze-melt service object name; and resolving said freeze-melt service object name in said context object to receive a representation of said freeze-melt service object.

8. The method providing a secure freeze-melt service as claimed in claim 7, wherein said secure freeze-melt service comprises an object implemented by a second object manager.

9. In an object-oriented system, said object-oriented system comprising first object manager, said first object manager managing a plurality of objects, said first object manager having a first object manager identifier that identifies said first object manager, a method providing a duplication service that creates duplicates of said objects, said method comprising the steps of:

creating a duplication service object, said duplication service object comprising a duplication operation for duplicating objects, said duplication service object having at least one duplication service object name;

providing a name server, said name server comprising a context object, said context object comprising a plurality of name-to-object associations, one of said plurality of name associations comprising an association of a duplication service object name to a representation of said duplication service object;

implementing a "get object manager identifier" operation in each of said plurality of objects, said "get object manager identifier" operation returning an object manager identifier associated with an object manager that manages the object;

implementing a transformation function that transforms said first object manager identifier into a duplication service object name;

obtaining for an object access to said duplication operation by invoking said "get object manager identifier" operation in said object to obtain said first object manager identifier;

calling said transformation function to transform said first object manager identifier into said duplication service object name; and resolving said duplication service object name in said context object to receive a representation of said duplication service object.

10. The method providing a secure duplication service as claimed in claim 9, wherein said secure duplication service comprises an object implemented by a second object manager.

* * * * *

UNITED STATES PATENT AND TRADEMARK OFFICE
CERTIFICATE OF CORRECTION

PATENT NO. : 5,581,761
DATED : December 3, 1996
INVENTOR(S) : Radia et al.

It is certified that error appears in the above-identified patent and that said Letters Patent is hereby corrected as shown below:

Title page,
Item [56], under OTHER PUBLICATIONS, insert -- Object Oriented Design with Application; author: Grady Booch, The Benjamin/Cummings Publishing Co., Redwood City, California, 1991, pages 113-114 --.

Column 8,
Line 58, delete "associated with said" and insert -- associated with --.

Signed and Sealed this

Twentieth Day of August, 2002

Attest:

JAMES E. ROGAN
Attesting Officer          Director of the United States Patent and Trademark Office